United States Patent
Matsunami et al.

(10) Patent No.: US 6,912,627 B2
(45) Date of Patent: Jun. 28, 2005

(54) METHOD OF CREATING A STORAGE AREA & STORAGE DEVICE

(75) Inventors: Naoto Matsunami, Hayama (JP); Yasuyuki Mimatsu, Yokohama (JP); Yoichi Mizuno, Yokohama (JP); Kenji Muraoka, Odawara (JP); Takashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 09/797,261

(22) Filed: Feb. 28, 2001

(65) Prior Publication Data

US 2002/0099914 A1 Jul. 25, 2002

(30) Foreign Application Priority Data

Jan. 25, 2001 (JP) .................................. 2001-016468

(51) Int. Cl.[7] .............................................. G06F 12/00
(52) U.S. Cl. ...................................... 711/154; 711/114
(58) Field of Search .......................... 711/111, 112, 114, 711/154

(56) References Cited

U.S. PATENT DOCUMENTS

| | | | | |
|---|---|---|---|---|
| 6,389,432 B1 | * | 5/2002 | Pothapragada et al. | 707/205 |
| 2002/0019908 A1 | * | 2/2002 | Reuter et al. | 711/112 |
| 2002/0087787 A1 | * | 7/2002 | Selkirk et al. | 711/114 |
| 2002/0133669 A1 | * | 9/2002 | Devireddy et al. | 711/114 |

* cited by examiner

*Primary Examiner*—Matthew Kim
*Assistant Examiner*—Woo H. Choi
(74) *Attorney, Agent, or Firm*—Townsend and Townsend and Crew LLP (57) ABSTRACT

An administrator is required to prepare in advance LU as a pool area when a user storage area is set to a storage. LU configuration is generally cumbersome and it is not easy for a general user to configure it. A pool manager 1 and a storage 1 setting utility in a management console 1 communicate with a program in a storage 1. The storage 1 sets a pool area having a designated capacity. In response to a volume forming request from the management console 1, the storage 1 sets a designated volume by setting the designated volume as a used capacity of the set pool area. When a volume is formed, a policy is designated to select a storage area having a corresponding attribute from the pool area.

6 Claims, 11 Drawing Sheets

1525 : LUN MANAGEMENT TABLE

| PORT NUMBER | TARGET ID | HOST LUN | INTERNAL LUN | WWN | S_ID | LU SIZE | RAID GROUP | POOL NUMBER |
|---|---|---|---|---|---|---|---|---|
| 0 | 0 | 0 | 11 | WWN 1 | S_ID1 | 80GB | 1 | NON-POOL |
| 0 | 0 | 0 | 12 | WWN 2 | S_ID2 | 10GB | 2 | 1 |
| 0 | 0 | 0 | 14 | WWN 4 | S_ID4 | 100GB | 4 | 2 |
| ------ | ------ | ------ | ------ | ------ | ------ | ------ | ------ | ------ |

FIG. 4

15271 : POOL AREA 1 MANAGEMENT TABLE

| POOL NUMBER | RAID GROUP | RAID LEVEL | RAID STRUCTURE | DISK DRIVE SPEED | NUMBER OF DEFINED LUNS | USED CAPACITY | REMAINING CAPACITY | TOTAL CAPACITY |
|---|---|---|---|---|---|---|---|---|
| 1 | 2 | 1 | 1D1P | Fast | 1 | 10GB | 10GB | 20GB |
| 1 | 3 | 5 | 4D1P | Mid | 0 | 0GB | 80GB | 80GB |

FIG. 5

15272 : POOL AREA 2 MANAGEMENT TABLE

| POOL NUMBER | RAID GROUP | RAID LEVEL | RAID STRUCTURE | DISK DRIVE SPEED | NUMBER OF DEFINED LUNS | USED CAPACITY | REMAINING CAPACITY | TOTAL CAPACITY |
|---|---|---|---|---|---|---|---|---|
| 2 | 4 | 5 | 15D1P | Slow | 1 | 100GB | 500GB | 600GB |
| 2 | 5 | 3 | 8D1P | Fast | 0 | 0GB | 320GB | 320GB |

FIG. 6

1528 : NON-POOL AREA MANAGEMENT TABLE

| POOL NUMBER | RAID GROUP | RAID LEVEL | RAID STRUCTURE | DISK DRIVE SPEED | NUMBER OF DEFINED LUNS | USED CAPACITY | REMAINING CAPACITY | TOTAL CAPACITY |
|---|---|---|---|---|---|---|---|---|
| NON-POOL | 1 | 5 | 4D1P | Mid | 1 | 80GB | 80GB | 160GB |
| NON-POOL | 2 | 1 | 1D1P | Fast | 0 | 0GB | 20GB | 20GB |
| NON-POOL | 3 | 5 | 4D1P | Mid | 0 | 0GB | 80GB | 80GB |

FIG. 7

1529 : POOL MANAGER REGISTRATION TABLE

| POOL MANAGER NUMBER | POOL AREA |
|---|---|
| 2030 | 1 |
| 2245 | 2 |

3115: POLICY MANAGEMENT TABLE

| # | POLICY | PERFORM-ANCE | RELIABILITY | COST | USABLE CAPACITY | DETAILS |
|---|---|---|---|---|---|---|
| 1 | FOR CRITICAL JOB | AA | A | HIGH | 10GB | 1. STORAGE 1, RAID GROUP 2, RAID LEVEL 1 (1D1P), FAST DRIVE |
| 2 | FOR NORMAL JOB | B | B | MIDDLE | 280GB | 1. STORAGE 1, RAID GROUP 3, RAID LEVEL 5 (4D1P), NORMAL DRIVE<br>2. STORAGE 2, RAID GROUP 4, RAID LEVEL 5 (4D1P), NORMAL DRIVE |
| 3 | FOR ECONOMY JOB | C | C | LOW | 160GB | 1. STORAGE 2, RAID GROUP 5, RAID LEVEL 5 (15D1P), SLOW DRIVE |

FIG. 10

Storage Pool Manager

■ SETTING LUN

| HOST NAME | HBA | WWN | | SETTING POLICY | HOST LUN | LU SIZE |
|---|---|---|---|---|---|---|
| Server2 | FC HBA1 | 11:22:33:44 | | FOR CRITICAL JOB ▶ | 0 | 10 GB |

FOR CRITICAL JOB
FOR NORMAL JOB
FOR ECONOMY JOB

ENTER PASSWORD
*******

CANCEL

■ DETAILS OF SETTING POLICIES

| # | POLICY | PERFORM-ANCE | RELIABILITY | COST | USABLE CAPACITY | |
|---|---|---|---|---|---|---|
| 1 | FOR CRITICAL JOB | AA | A | HIGH | 10GB | 1. STORAGE 1, RAID GROUP 2, RAID LEVEL 1 (1D1P), FAST DRIVE |
| 2 | FOR NORMAL JOB | B | B | MIDDLE | 80GB | 1. STORAGE 1, RAID GROUP 3, RAID LEVEL 5 (4D1P), NORMAL DRIVE<br>2. STORAGE 2, RAID GROUP 4, RAID LEVEL 5 (4D1P), NORMAL DRIVE |
| 3 | FOR ECONOMY JOB | C | C | LOW | 160GB | 1. STORAGE 2, RAID GROUP 5, RAID LEVEL 5 (15D1P), SLOW DRIVE |

1526: RAID GROUP MANAGEMENT TABLE

| RAID GROUP NO. | RAID LEVEL | RAID STRUCTURE | NUMBER OF USED DISK DRIVES | USED DISK DRIVE NOS. | USED DISK DRIVE SPEED | USED CAPACITY | REMAINING CAPACITY | TOTAL CAPACITY |
|---|---|---|---|---|---|---|---|---|
| 1 | 5 | 4D1P | 5 | 0,1,2,3,4 | Mid | 80GB | 80GB | 160GB |
| 2 | 1 | 1D1P | 2 | 5,6 | Fast | 10GB | 30GB | 40GB |
| 3 | 5 | 4D1P | 5 | 7,8,9,10,11 | Mid | 0GB | 160GB | 160GB |
| 4 | 5 | 15D1P | 16 | 12,13,14, 15,16,17, 18,19,20, 21,22,23, 24,25,26,27 | Slow | 100GB | 500GB | 600GB |
| 5 | 3 | 8D1P | 9 | 28,29,30, 31,32,33, 34,35,36 | Fast | 0GB | 320GB | 320GB |

METHOD OF CREATING A STORAGE AREA & STORAGE DEVICE

BACKGROUND OF THE INVENTION

The present invention relates to a management method for storage areas of a storage device, and more particularly to a method of exclusively managing each of a plurality of already set storage areas.

The capacity of a storage device (hereinafter simply called a "storage") is increasing more and more, such as a disk array device having a number of disks. For this reason, one server does not occupy one storage, but a plurality of servers share one storage by using a network dedicated for the storage, called a storage area network (SAN). SAN has the advantage that desired connections can be established between a plurality of servers and storages to share data. On the other hand, SAN has the disadvantage that the network configuration becomes complicated and operation management is difficult.

A method called a "storage pool management" has been devised as a method of facilitating management of storage areas of a large capacity storage connected to a complicated network. With this "storage pool management", the storage area of a storage is called a "storage pool", and the "storage pool" is collectively managed as a general area to allocate a necessary capacity of the storage requested from a user.

Figure 12:
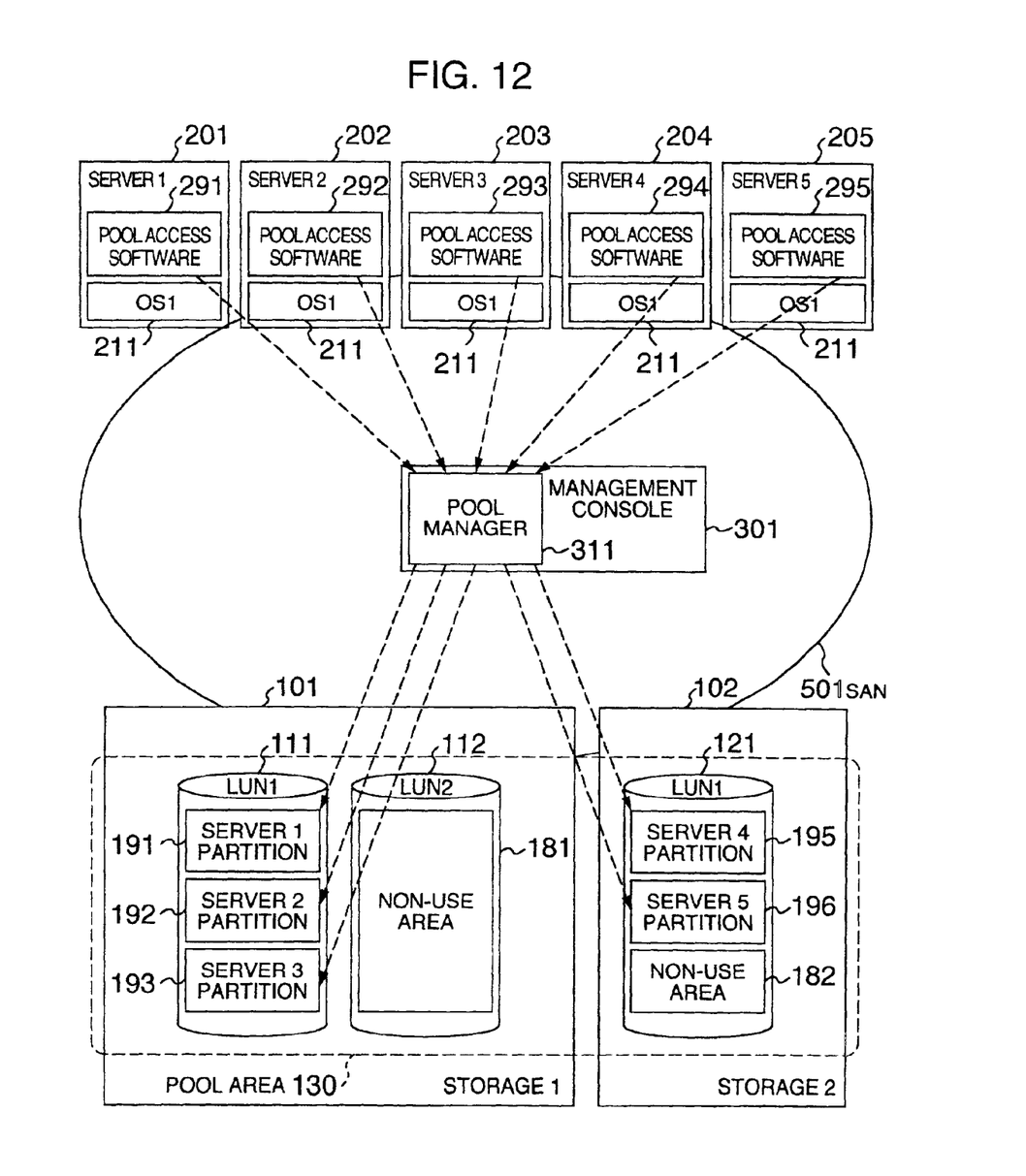
FIG. 12 is a diagram showing the configuration of a conventional system.

FIG. 12 is a diagram showing the structure of a conventional system for performing storage pool management. Reference numerals 101 and 102 represent storages, reference numerals 201 to 205 represent servers 1 to 5, reference numeral 301 represents a management console, and reference numeral 501 represents a SAN.

In the management console 301, reference numeral 311 represents a pool manager which is software for executing storage pool management.

In the server 20x (x=1-5, x is used hereinafter as a representative number), reference numeral 211 represents an OS. Reference numeral 29x represents pool access software for making a storage pool area accessible.

In a storage 1 (101), reference numerals 111 and 112 represent logical unit numbers (LUN) 1 and 2, and in a storage 2 (102), reference numeral 121 represents LUN 1. Reference numeral 130 represents a pool area which is collectively managed by the pool manager 311.

The pool area 130 is realized by forming beforehand a LUN for the pool area and then assigning this LUN to the pool area. Forming an LU and assigning LU to LUN is called forming LUN. The unit of a storage area called LU is also called a volume. When the pool area is to be expanded, LUN is newly formed which is registered to the pool area 130 by the pool manager 311.

The pool manager 311 generates a partition (191, . . . ) dedicated to each server x in the pool area 130. The pool manager 311 notifies partition setting information to the pool access software 29x of each server x so that partitions other than the partition dedicated to each server x cannot be recognized.

SUMMARY OF THE INVENTION

According to conventional techniques, it is necessary for a user to prepare beforehand LUN for the pool area. Generally, it is necessary for a user to configure LUN corresponding to a desired pool size by using storage configuration setting utility software (hereinafter called a utility) presented by a storage maker. In order for a user to configure LUN for a disk array storage, a number of works are required. Such works include a work of loading disk drives necessary for the disk array, a setting work for a RAID (Redundant Arrays of Inexpensive Disks) level, a formatting work for generating guarantee codes called parities for disk drive failures, a LUN setting work, a work of selecting a storage controller for controlling LUN, a work of establishing an access bus from a host to LUN, and other works. As above, a LUN configuration method is generally cumbersome. Furthermore, the LUN configuration method is different at each company or at each product type. Therefore, in the environment having a plurality of different storages, it is difficult for a user to configure LUN unless the user is an expert of configuration works, and the operation facilitation which is essential for a storage pool cannot be achieved satisfactorily.

Even if a user is an expert of configuration works, it is difficult, from a viewpoint different from configuration works, to select an optimum storage from a plurality of storages while the cost, performance and reliability are taken into consideration, and to configure LUN having a proper capacity to be determined from a past use state and a future use state.

Conventional techniques do not consider a hetero environment in which servers operate on different OSes. According to conventional techniques, an area used by each server is constituted of a partition whose format is dependent upon OS. Therefore, although a plurality of partitions can be set and managed in the same LU in the single OS environment, it is difficult in a hetero environment for each OS to set and manage a partition in the same LU. In order to set a plurality of partitions in the same LU and allow a plurality of servers to use corresponding partitions, access exclusive management for each partition is necessary. However, such management is not known to date.

Still further, conventional techniques cannot deal the environment with a plurality of different pool managers.

It is an object of the present invention to provide a method of realizing storage pool management easily without forming beforehand LUN for a storage pool area.

It is another object of the invention to provide a method of supplying each host with a proper storage area in accordance with a metaphysical user request called a predetermined policy.

It is another object of the invention to provide a method of increasing a disk capacity at any time or on-demand when a disk capacity becomes insufficient, without sufficient consideration of the past and future use states.

It is still another object of the invention to provide a storage pool management method compatible with a hetero server environment.

It is still another object of the present invention to provide a storage pool management method compatible with a plurality type of storages.

It is still another object of the present invention to provide a storage pool management method compatible with both an environment with a plurality of pool managers and a conventional environment without pool management.

According to one aspect of the present invention, there is provided a method of setting a logical storage area to a storage connected to a management terminal via a network, comprising the steps of: transferring information on the logical storage area input to the management terminal to the storage via the network; and setting the logical storage area to the storage in accordance with information on the storage stored in the storage and the information on the logical storage area transferred via the network.

According to the present invention, in the method of setting a storage area to a storage, a pool area having a capacity designated by the management console is set to the storage in the form of a pool area management table, in response to a volume forming request, a designated volume is set as a used capacity of the pool area, and the designated volume is set in the storage.

According to the invention, in the method of setting a storage area to a storage, a plurality of policies are set in accordance with different attributes of storage areas in the storage, and in response to designation of a policy through user-friendly operation, a volume is set.

According to the invention, the method of setting a storage area to a storage can expand the capacity of a volume on-demand when an insufficient volume capacity is detected.

DETAILED DESCRIPTION OF THE EMBODIMENTS

Figure 1:
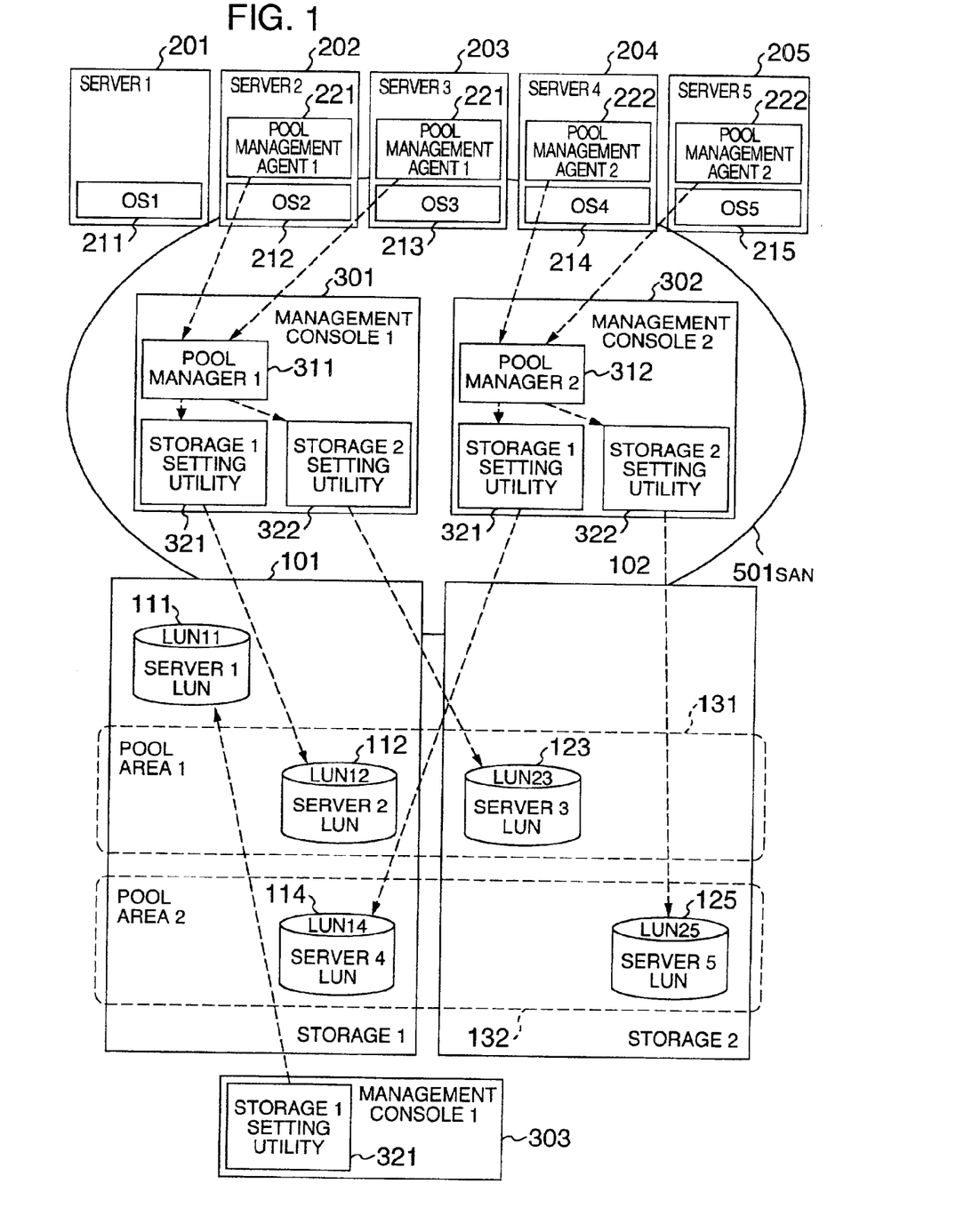
FIG. 1 is a diagram showing the configuration of a system according to a first embodiment according to the invention.

FIG. 1 is a diagram showing the configuration of a system of the first embodiment. In FIG. 1, 10x represents a storage x (x=1, 2, . . . , x is used hereinafter as a representative number), 20x represents a server as a host computer, 30x represents a management console, and 501 represents a SAN. In the management console 30x, 31x represents a pool manager x, and 32x represents a storage x setting utility. In the server x, 21x represents an OS x, and 22x represents a pool management agent x. In the storage 10x, 11x and 12x represent LUN, and 13x represents a pool area managed by the pool manager x. The pool area 13x is configured overriding both the storages 1 and 2. The pool managers 311 and 312 are independent pool managers without communications therebetween. The management console 30x is a computer on which the pool manager 31x runs as a program. The pool manager 31x program is stored in a storage medium, and the program in this storage medium is read from a drive connected to the management console 30x and executed by the management console 30x to run the system.

Figure 2:
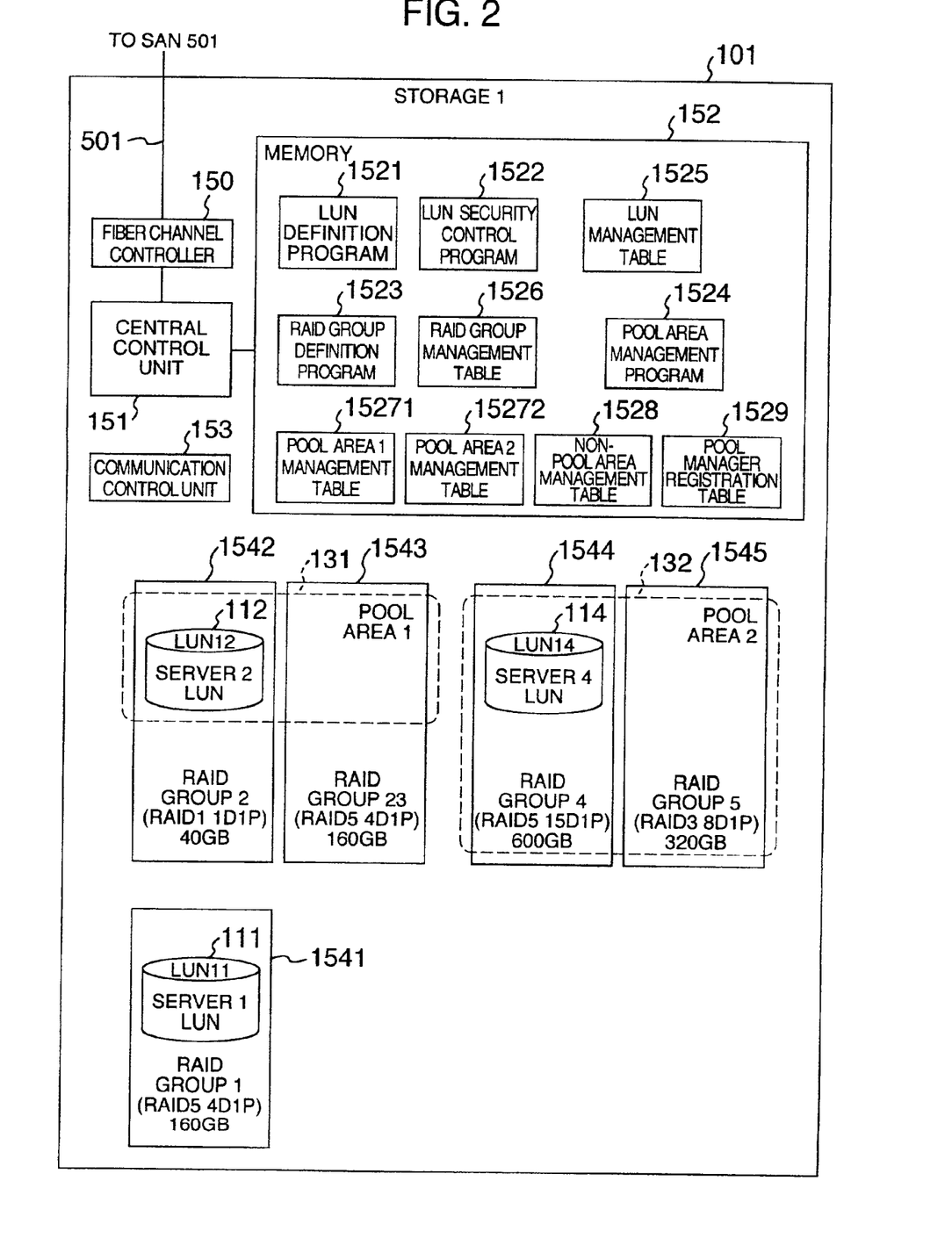
FIG. 2 is a diagram showing the structure of a storage of the embodiment.

FIG. 2 is a diagram showing the structure of the storage 1. Reference numeral 150 represents a fiber channel controller for the connection to and control of SAN 501, reference numeral 151 represents a central control unit for controlling the whole storage, reference numeral 152 represents a memory for storing programs and data used for the internal control of the storage 1 by the central control unit 151, reference numeral 153 represents a communication control unit for controlling communications with the management console x, 154x represents a RAID group x, 11x represents LUNx, and 13x represents a pool area x.

In the memory 152, the programs and tables described below are stored.

A LUN definition program 1521 is used for defining and forming a plurality of LUNs. A LUN security control program 1522 is used for controlling a "LUN security function" with which the central control unit 151 decides an access permission/inhibition for each LUN in order to make each server 20x can exclusively use LUN. A LUN management table 1525 stores LUN security information of access inhibition/permission for each LUN of each server, attribute information of each LUN, and correspondence information between a host LUN to be recognized by the server 20x and an internal LUN for managing the storage. A RAID group definition program 1528 defines, configures and manages a RAID group constituted of a plurality of disk drives. A RAID group management table 1526 stores definition information of each RAID group. A pool area management program 1524 is used for managing pool areas in order to manage storage pools defined in the storage 1. A pool area x management table 1527x stores definition information of pool areas x managed by the pool manager x. A non-pool area management table 1528 stores definition information of a non-pool area which is used by a user by directly controlling the storage 1 setting utility 321 without involving the pool manager. A pool manager registration table 1529 stores registration information of pool managers.

A disk group made of a plurality of disk drives constituting a RAID type disk array and generating redundant data called parities for disk drive failures is called a RAID group. A RAID group 1 shown in FIG. 2 is a RAID group at a level 5 made of five disk drives. 4D1P means a structure of data disks corresponding to four disk drives and parity disks corresponding to one disk drive. Assuming that the capacity of one disk drive is 40 GB, the total usable capacity of this RAID group 1 is 4 drives×40 GB=160 GB. A RAID group 2 has a RAID level 1 and two disk drives having a total usable capacity of 40 GB. Other RAID groups are structured in the same way described above.

Figure 13:
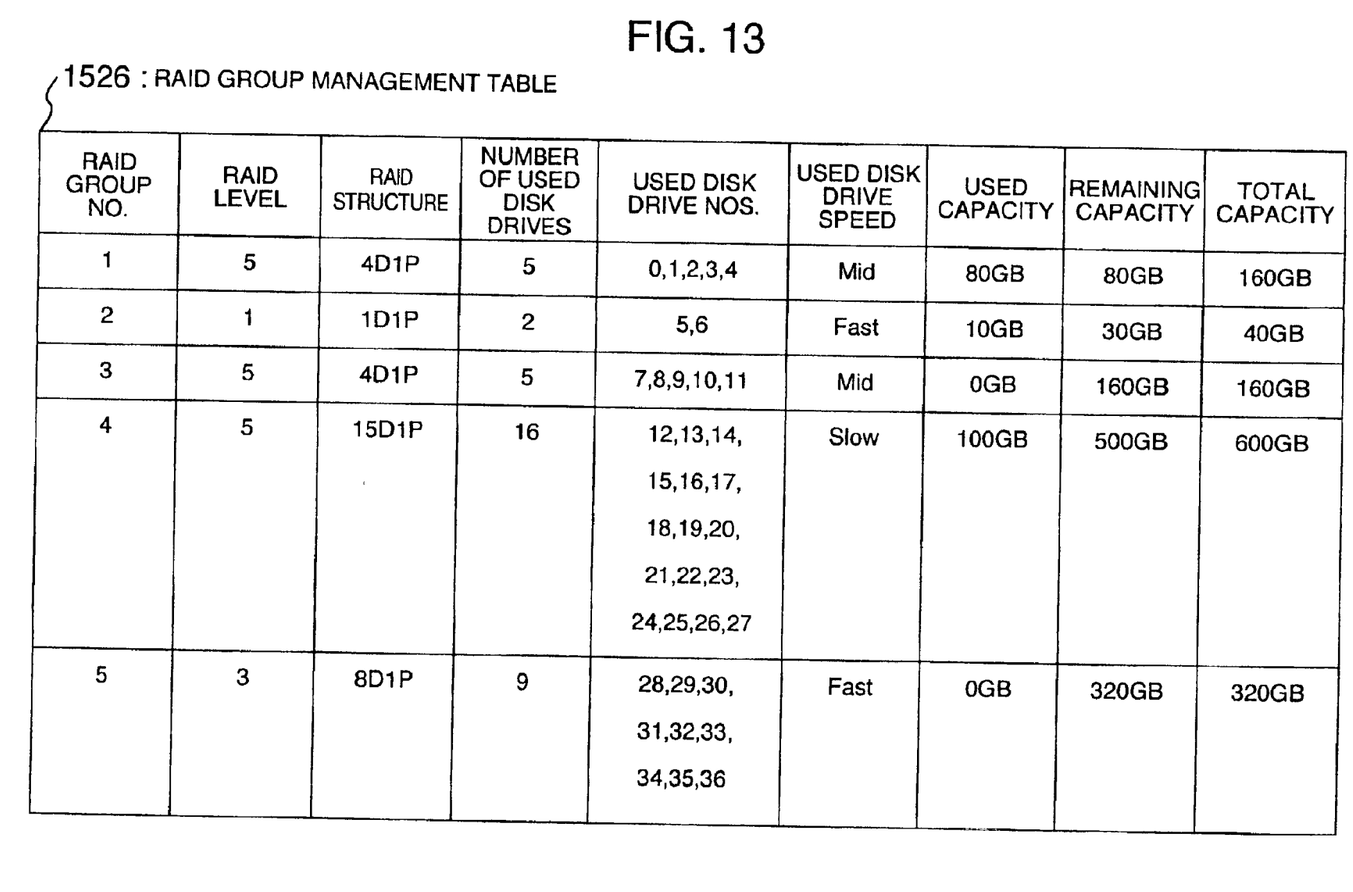
FIG. 13 is a diagram showing a RAID group management table according to the invention.

FIG. 13 shows the structure of the RAID group management table 1526. The RAID group management table 1526 stores information on a RAID group number, a RAID level, a RAID structure, the number of used disk drives, the number of each used disk drive, a used disk speed, a used capacity, a remaining capacity, and a total capacity. The RAID group number is an identification number of the RAID group. The RAID level shows a RAID level of the RAID group. The RAID structure shows a RAID structure of the RAID group. The number of used disk drives shows the number of disk drives constituting the RAID group. The used disk drive number is the number of each disk drive constituting the RAID group. The used disk speed shows the speed of the disk drives constituting the RAID group, and in this embodiment, three speeds "Fast", "Mid" and "Slow" are defined. The used capacity shows the used capacity in the total capacity of the RAID group. The remaining capacity shows the capacity still not used in the total capacity of the RAID group. The total capacity shows the total capacity of the RAID group. The RAID group definition program 1523 sets the definition information of the RAID group management table 1526.

Figure 3:
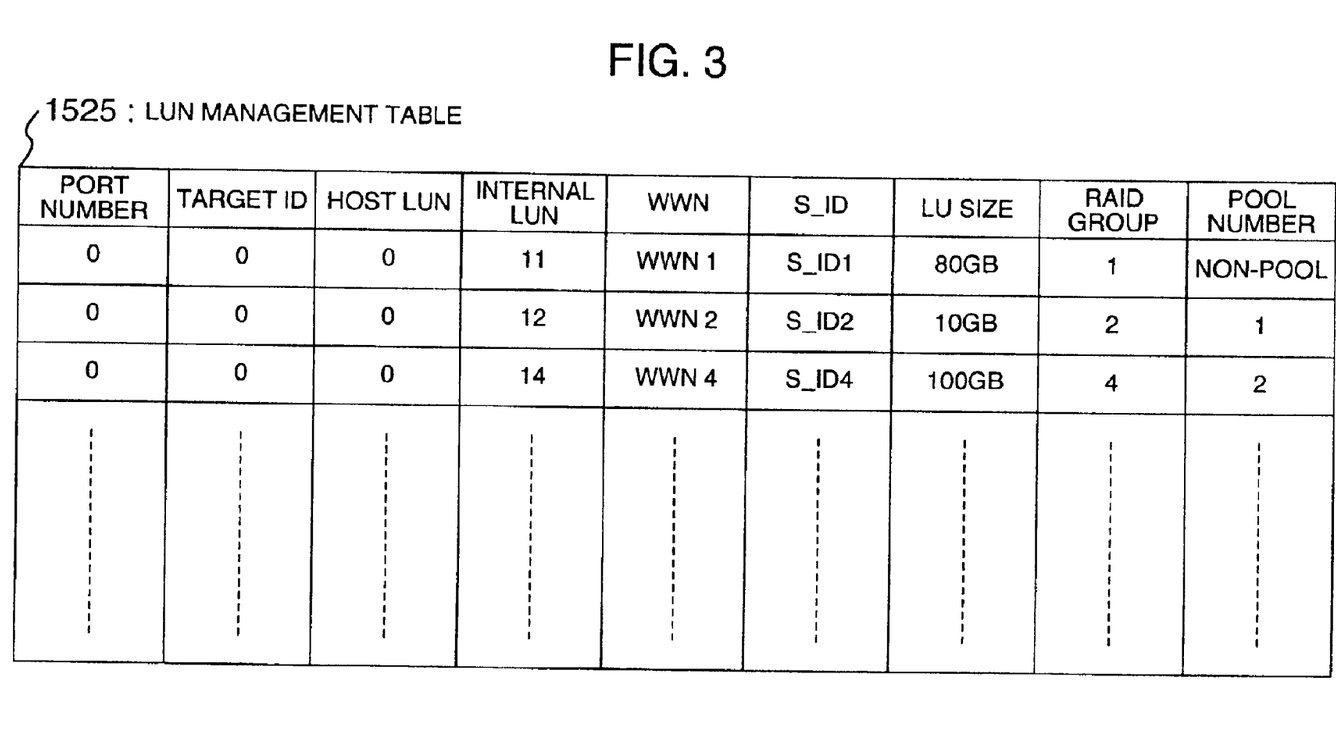
FIG. 3 is a diagram showing the structure of a LUN management table of the embodiment.

FIG. 3 shows the structure of the LUN management table 1525. The LUN management table 1525 stores information on a port number, a target ID, a host LUN, an internal LUN, a WWN, an S_ID, an LU size, a RAID group, and a pool number.

The port number is the number of a connection port of the fiber channel constituting SAN 501. In this embodiment, it is assumed that the number of ports is one and "0" is stored for all ports.

The target ID is an identification ID assigned to the storage 10x having a connection interface with the server 20x. In this embodiment, the connection interface between the computer 20x and storage 10x is a fiber channel, and a unique destination IF (D_ID) and an arbitrated loop physical address (AL_PA) are provided for each port. However, since the port number is stored in the LUN management table 1525, the target ID may not be stored, or D_ID and AL_PA determined when the fiber channel is initialized may be stored. If the connection interface is SCSI, a plurality of IDs can be set to the same port so that the target ID to which each LUN belongs is stored. In this embodiment, since the fiber channel is used, the column of the target ID is not used and "0" is stored for all target IDs.

The host LUN and internal LUN show a correspondence between the internal LUN of the storage identified by a LUN management number and the host LUN recognizable by the server 20x.

The storage 10x can define a plurality of internal LUNS. The internal LUN is a unique number for distinguishing between a plurality of LUNs. The server 20x cannot discriminate between LUNs in some case unless they have sequential numbers starting from 0. It is therefore necessary that the storage remaps LUNs to have sequential numbers starting from 0 for each server. LUN after this conversion is called the host LUN. In FIG. 3, the internal LUN 11 is defined as a host LUN 0 and the internal LUN 12 is also defined as the host LUN 0. Although both LUNs are defined as the host LUN 0, they are used by different computers 20x so that only the server having WWNx shown in FIG. 3 to be described below can access.

WWN stands for a world wide name which is information for identifying the fiber channel controller which is a connection interface to SAN 501. During a port login process for establishing a connection between ports of the fiber channel, WWNx of the computer 20x is notified to the storage 1. Access permission/inhibition is judged only from the relation between LUN and WWN set in the LUN management table 1525. For example, the internal LUN 11 can be accessed only by the server 101 having WWN 1, the internal LUN 12 can be accessed only by the server 102 having WWN 2, and other servers cannot access these LUNs. Such an exclusive access control is executed by the LUN security control program 1522.

S_ID is ID information stored in the frame header of the fiber channel and identifies a source (initiator) which formed the frame. S_ID is dynamically assigned when the fiber channel is initialized. WWN is a value uniquely set by a fiber channel port exchanged during initialization. It is, however, not contained in each frame header. Therefore, by setting a relation between WWN and S_ID, the computer 20x can be identified by checking only S_ID without checking WWN for each frame.

The LU size shows a capacity of LUN. The RAID group shows the number of the RAID group with LUN. The pool number shows the number of a pool area to which LUN belongs. A "non-pool" means a pool area not managed as a pool area. "1" and "2" show the pool areas 1 and 2, respectively. The details of the pool area will be described later.

Figure 4:
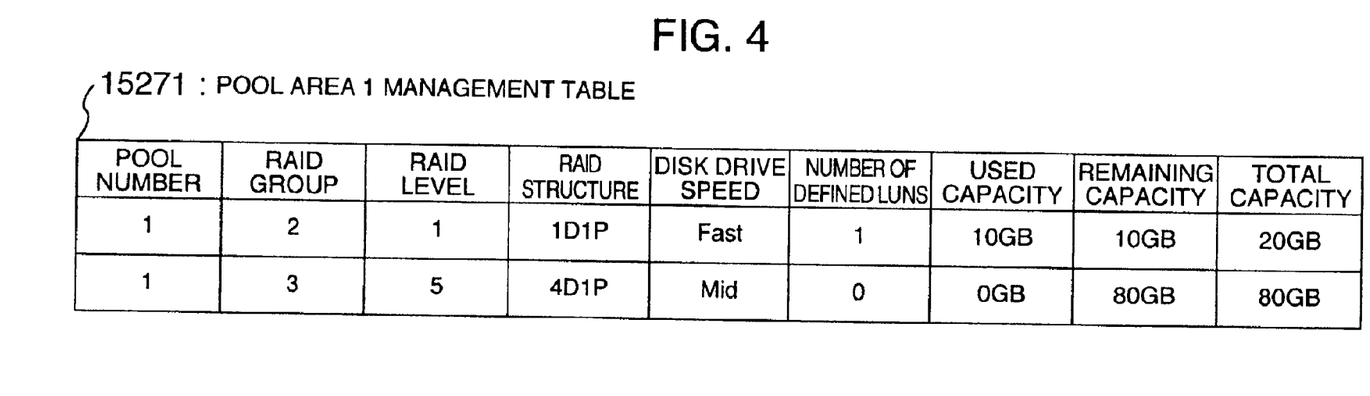
FIG. 4 is a diagram showing the structure of a management table for a pool area 1 of the embodiment.
Figure 5:
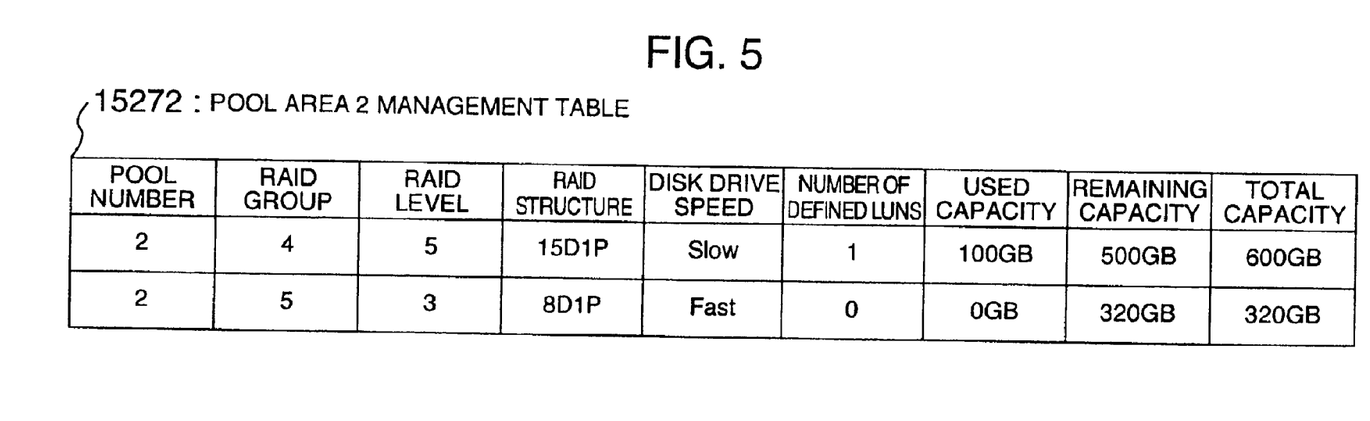
FIG. 5 is a diagram showing the structure of a management table for a pool area 2 of the embodiment.

FIGS. 4 and 5 show the structure of the pool area management table 1527x. FIG. 4 is a table for managing the pool area 1, and FIG. 5 is a table for managing the pool area 2. A pool number is an identification number for distinguishing between a plurality of pool areas x. A RAID group is the number of the RAID group constituting the pool area. A RAID level is a RAID level of the RAID group. A RAID structure shows the structure of data disks and parity disks. A disk speed shows a speed of a disk drive constituting the RAID group. The number of defined LUNs shows the number of LUNs already defined in the pool area. A used capacity, a remaining capacity and a total capacity show the total used capacity, total remaining capacity and total capacity of all LUNs already defined in the RAID group having the corresponding pool number.

In FIG. 4, the pool area having the pool number 1 is defined as having two areas including the RAID groups 2 and 3. The RAID group 2 has a disk array structure of RAID level 1 and 1D1P. The disk drive used for the RAID group 2 has a high speed (Fast). In the RAID group 2, only one LUN having a capacity of 10 GB has already been defined, and has an unused pool area having the remaining capacity of 10 GB. The RAID group 3 has a disk array structure of RAID level 5 and 4D1P. The disk drive used for the RAID group 3 has a middle speed (Mid). In the RAID group 3, LUN is still not defined and has an unused pool area having the remaining capacity of 80 GB. The above-description is applied in a similar way to the pool area 2 management table shown in FIG. 5.

One storage x can have a plurality of pool area management tables 1527x so that a plurality of pool managers each can independently have the pool area management table.

Figure 6:
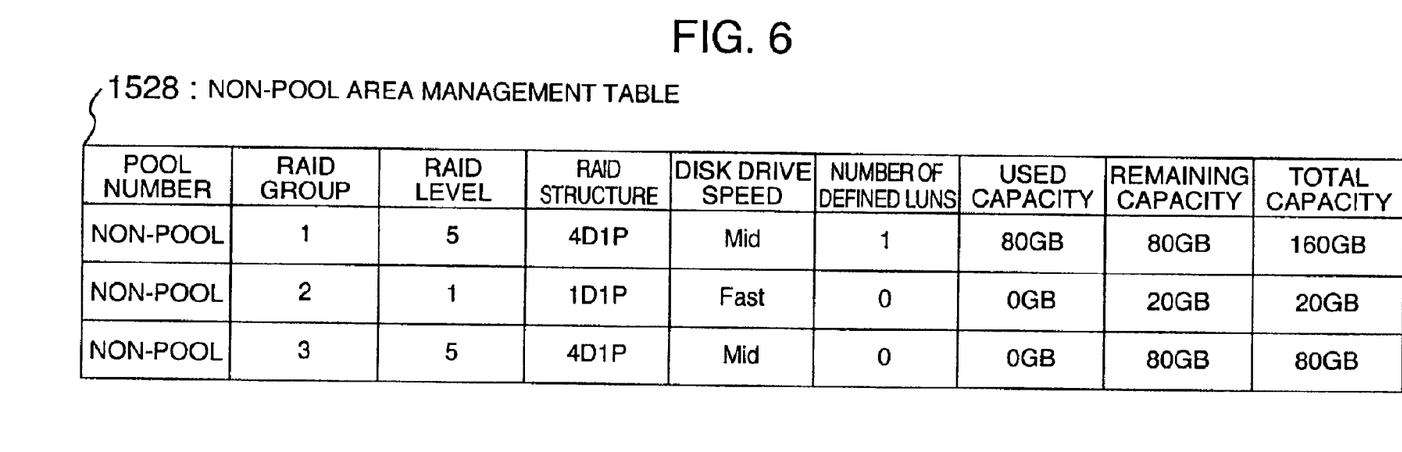
FIG. 6 is a diagram showing the structure of a management table for a non-pool area of the embodiment.

FIG. 6 is a diagram showing the structure of the non-pool area management table 1528. This embodiment uses both automatic LUN definition under the storage pool management and conventional manual LUN definition using non-pool areas. The invention is applicable to the case having no non-pool areas.

The structure of the non-pool area management table 1528 is the same as that of the pool area x management tables shown in FIGS. 4 and 5. An area belonging to neither the pool area 1 nor the pool area 2 is the non-pool area used for conventional manual setting. In the example shown in FIG. 4, the non-pool area in the RAID group 2 is an area other than the pool area 1 shown in FIG. 1 so that the total capacity is 20 GB and the remaining capacity is 20 GB because there is no defined LUN.

Figure 7:
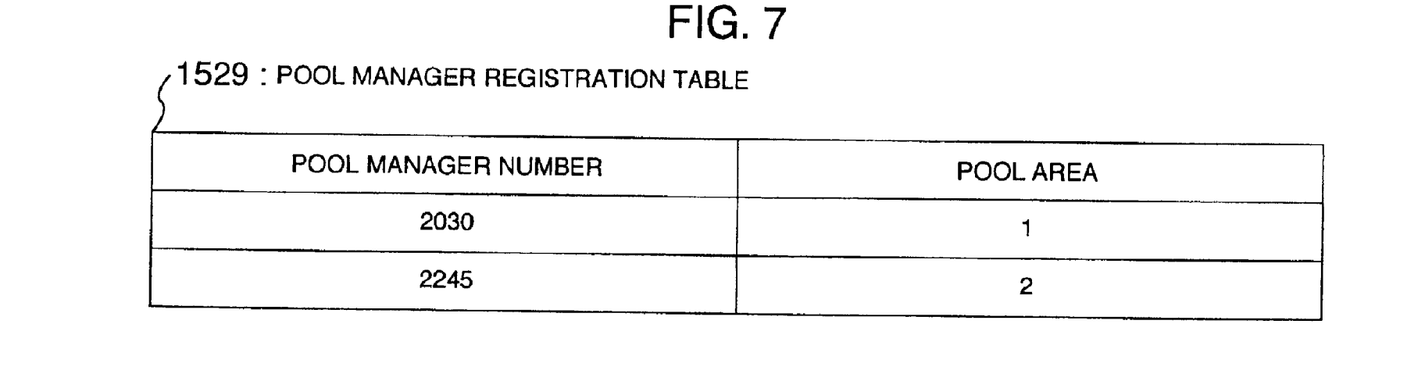
FIG. 7 is a diagram showing the structure of a registration table for pool managers of the embodiment.

FIG. 7 is a diagram showing the structure of the pool manager registration table 1529. In this embodiment, since there are a plurality of pool managers, it is necessary to determine in advance which pool manager deals with which pool area. A pool manager number is an identification number of each pool manager and takes an optional number which is to be guaranteed unique. A pool area number is the number of each pool area which can be managed by the pool manager.

The operation of this system will be described. First, a pool area defining work will be described which work should be executed before storage pool management. In the following, the operation of defining the pool area 1 under the management of the pool manager 1 will be described.

An administrator at the management console 1 (301) controls the storage 1 (101) and storage 2 (102) by using the storage 1 setting utility 321 and storage 2 setting utility 322.

First, a RAID group is defined. As shown in FIG. 2, it is assumed that five RAID groups are defined for the storage 1. Similarly, RAID groups are defined for the storage 2 (this definition is not shown). As the administrator operates upon the utilities 321 and 322, communications are established between the utilities and storages and the RAID group definition program 1523 for the storage 1 is executed. Definition information generated upon execution of the RAID group definition program 1523 is stored in the RAID group management table 1526.

Next, the administrator registers the pool manager 1 by operating upon the utilities 321 and 322. The administrator then executes the pool area management program 1524 for the storage 101 via the utilities 321 and 322. The pool area management program 1524 registers the pool manager number in the pool manager registration table 1529. In this embodiment, as shown in FIG. 7, the pool manager 1 is assigned to the pool area 1.

Next, the administrator executes the pool area management program 1524 by operating upon the utilities 321 and 322 to set the pool area. As shown in FIG. 4, the pool area management program 1524 sets 20 GB of the RAID group 2 and 80 GB of the RAID group 3 as the pool area 1. The pool area definition work for the pool manager 1 is therefore completed for the storage 1. With similar operations, the pool area definition work for the pool manager 1 is performed for the storage 2. Further, the definition work for the pool manager 2 is performed for both the storages 1 and 2. With these operations, the preparatory work is completed. At this time it is unnecessary to define LUN.

Figure 8:
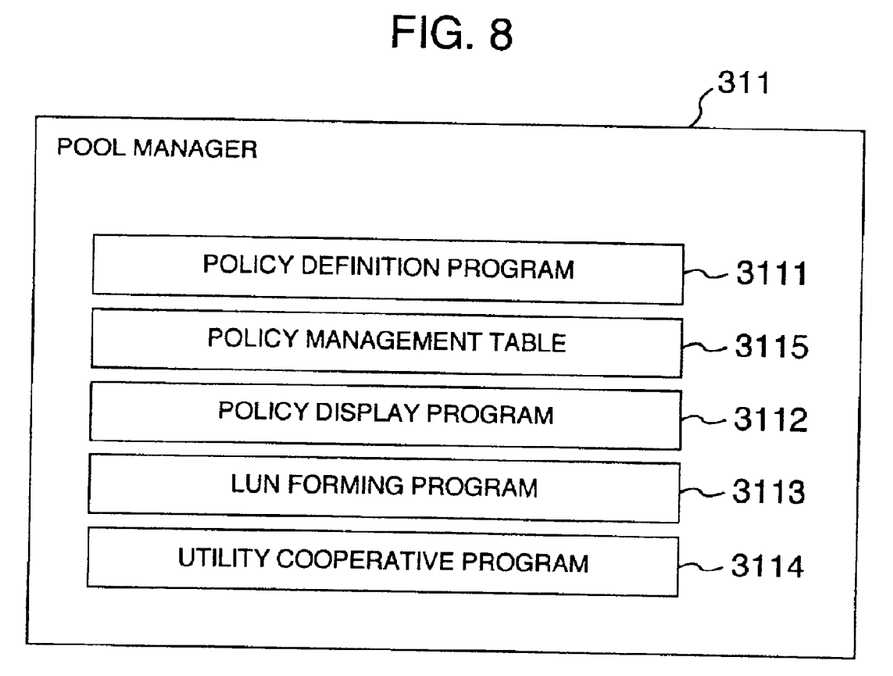
FIG. 8 is a diagram showing a policy management table of the embodiment.

FIG. 8 is a diagram showing the structure of the pool manager 311. The pool manager 311 has: a policy management table 3115 for setting policies to be described later; a policy definition program 3111 for supporting policy definition; a policy display program 3112 for displaying the contents of the policy management table 3115; a LUN forming program 3113 for supporting user formation of LUN; and a utility coordinated program 3114 for setting LUN in the LUN management table 1525 in coordination with the LUN definition program 1521 for the storage 1 (101) via the storage 1 setting utility 321.

Policy definition by the pool manager will be described.

Policy is predetermined rules described in easy-to-understand words and expressions so that a user can use or manage pool areas easily.

Figure 9:
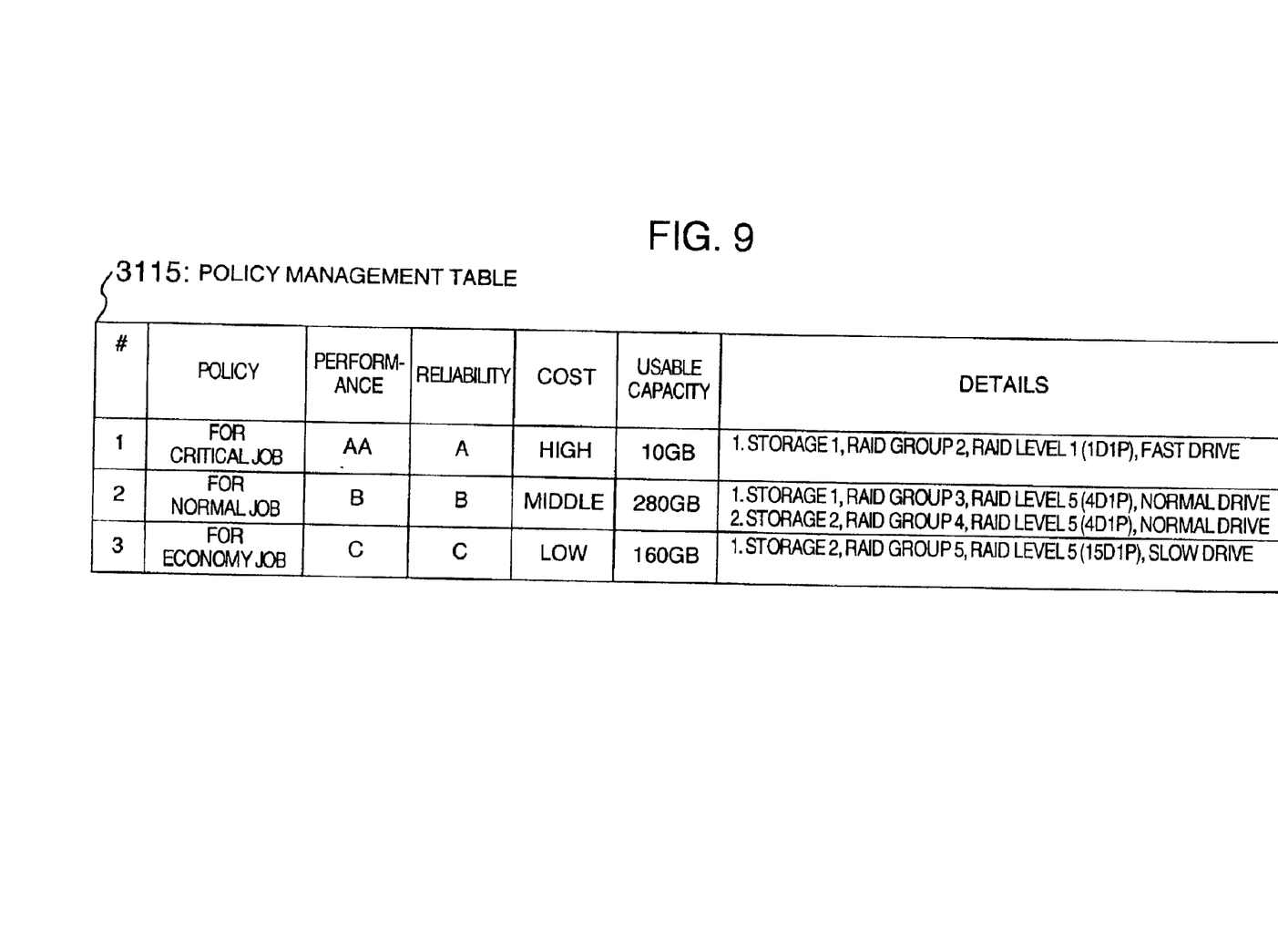
FIG. 9 is a diagram showing the structure of a pool manager of the embodiment.

FIG. 9 is a diagram showing the structure of the policy management table 3115 managed by the pool manager 1. In this example, three policies can be selectively used. A policy #1 is "for critical job". The attributes of the policy "for critical job" include a high performance (AA), a high reliability (A), a high cost, and a usable capacity of 10 GB. All of a specific storage name, a RAID group number, a RAID level, a disk configuration and the like are stored in a "details" column.

A policy #2 is "for normal job". The attributes of the policy "for normal job" include a middle performance (B), a middle reliability (B), a middle cost, and a usable capacity of 280 GB. Supplemental information on the usable capacity of 80 GB in the storage 1 and 200 GB in the storage 2 is stored in the "details" column.

A policy #3 is "for economy job". The attributes of the policy "for economy job" include a low performance (C), a low reliability (C), a low cost, and a usable capacity of 160 GB. Supplemental information that the usable capacity is stored in the storage 2 having a slow disk drive is stored in the "details" column.

In accordance with the knowledge level of a user, the user can select only by using the policy, by using the attributes written in easy words, or by considering also the supplemental information. The policies are displayed by the policy display program 31x2 of the pool manager 31x and a desired policy is selected.

Each policy is required to be defined before the user forms LUN. The administrator activates the storage x utility 32x and operates thereupon to acquire pool area information. The storage x setting utility 32x sends an information acquire command together with the identification number of the pool manager to the storage x. The pool area management program 1524 returns the information of the pool area x corresponding to the command and stored in the pool area x management table 1527x, back to the storage x setting utility 32x. The administrator acquired the information stored in the pool area x management table 1527x activates the policy definition program 31x1 of the pool manager x to define the policy management table 31x5 such as shown in FIG. 9. The administrator can set arbitrarily a policy name and a grade division of performance, reliability or cost. The usable capacity and details are based upon the information in the pool area x management table 1527x. With the above operations, a preparatory work is completed.

A work of forming LUN by a user using storage pool areas will be described. In this embodiment, a user accesses to and operates upon the management console 301 to form LUN for the server 202.

Figure 10:
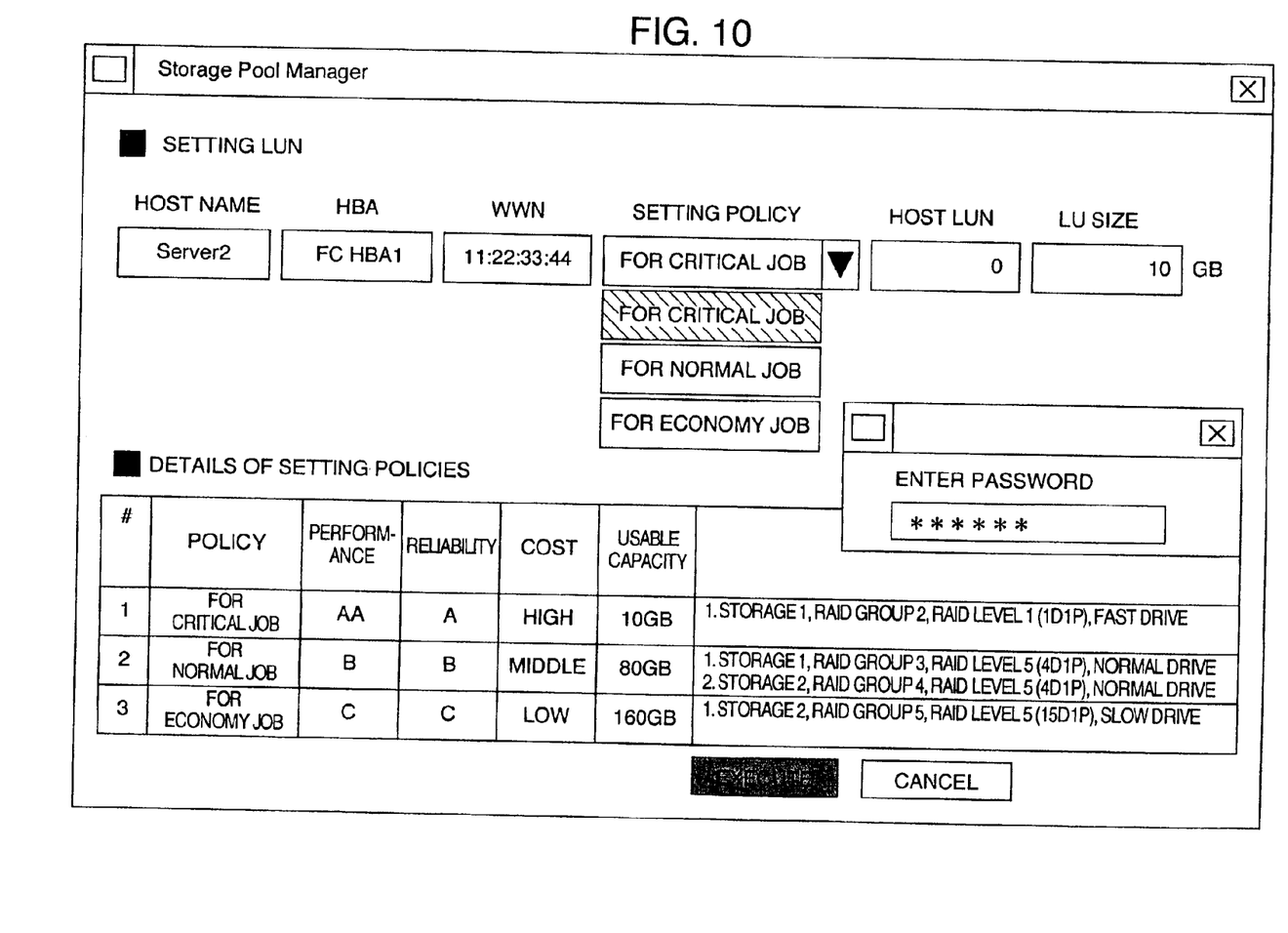
FIG. 10 is a diagram showing a LUN setting screen of the embodiment.

FIG. 10 shows an example of a screen layout formed by the LUN forming program 3113 of the management console 301. A user enters an object host name, e.g., "Server 2" for which LUN is formed, into a predetermined field. The pool manager 1 (311) communicates with the pool management agent 1 (221) of the server 2 (202). The pool management agent 1 (221) searches an HBA (host bus adapter) of the server 2 (202) to find a fiber channel board. If the fiber channel board is found, its WWN is acquired and transmitted to the pool manager 1 (311). Upon reception of this, the pool manager 1 (311) displays the acquired HBA name and WWN in the HBA and WWN fields, by using the LUN forming program 3113. The user refers to the policy management table 3115 displayed on the screen, and enters a desired policy, a host LUN to be set to the server, and a desired capacity (LU size). It is herein assumed that the selected policy is "for critical job", the designated host LUN is "0" and a designated capacity is "10 GB".

In forming LUN in a pool area having a high cost such as "for critical job", it can be set in such a manner that a user is required to enter a password so that only a proper person can form LUN.

After the user completes the setting, an "execute" button is depressed. Upon depression of this button, the utility coordinated program 3114 of the pool manager 1 (311) starts operating. The utility coordinated program 3114 calls the storage 1 setting utility 321 and passes arguments to it, the arguments including the pool manager number, storage number, WWN, RAID group number, host LUN number and LUN capacity. Upon reception of these arguments, the storage 1 setting utility 321 communicates with the storage 1 and passes the arguments to it.

The pool area management program 1524 for the storage 1 received the arguments confirms whether the remaining capacity written in the pool area 1 management table 15271 satisfies the designated capacity. If it is satisfied, the used capacity and remaining capacity are updated to the values after LUN formation.

In accordance with the arguments, the LUN definition program 1521 for the storage 1 forms LU of 10 GB in the RAID group 2. More specifically, the port number, target ID, host LUN, internal LUN and WWN are set in the LUN management table 1525.

After the LUN forming work is completed, the storage 1 returns a completion notice to the storage 1 setting utility 321. Upon reception of the completion notice, the storage 1 setting utility 321 passes it to the pool manager 1 (311). The LUN forming program 3113 of the pool manager 1 (311) displays a notice that LUN formation succeeded, on the LUN forming screen. With the above operations, LUN formation is terminated.

If a user does not use a policy, the number of a storage and a RAID group are selected instead of selecting a policy.

Although the LUN forming procedure by the pool manager 1 has been described above, LUN can also be formed by the pool manager 2 in the same manner. The storage x (10x) has a pool area x management table 1527x dedicated to the pool manager x (31x) to manage each area. It is therefore possible to prevent generation of access conflict by a plurality of hosts, and failures such as losing user data to be caused by erroneous setting and erroneous deletion. The pool area management program 1524 makes public the contents of the pool area x management table 1527x only to the pool manager x (31x).

A plurality of pool managers exist, for example, when pool management policies are different, when a different pool management is performed depending upon an application field, when areas are intentionally divided, when types of usable storages are different, and in other cases. These cases generally occur if the environment scale becomes somewhat large. Such an environment can be dealt with the present invention, which is an advantageous feature of the invention.

LUN is required to be formed in some cases by considering the physical structure of disk drives in order to improve the performance, such as by forming a table area of a database. In such a case, optimization may be performed through manual LUN setting by a user rather than through automatic LUN setting in a storage pool. Even if LUN setting becomes possible by storage pool management, it becomes necessary in some cases to use conventional LUN setting.

In this embodiment, a conventional method of setting LUN by a user directly using the storage 1 setting utility 321 is also realized in the following manner.

The pool area management program 1524 of the storage x limits the pool area to be managed by the pool manager 31x, by using the pool area x management table 1527x. When LUN is acquired, the non-pool area is not used. When the utility 321 forms LUN, the pool area management program 1524 makes public only the area set in the non-pool area management table 1528, i.e., an area other than the pool area. Therefore, LUN will not be formed in the pool area.

As described above, since both the conventional LUN setting and the on-demand LUN setting by storage pool management can exist, a LUN setting method suitable for each application field can be selected.

According to this embodiment, it is not necessary to form beforehand LUN as the storage pool area, but LUN having a desired capacity can be formed at any time when necessary.

A user can easily form LUN only by designating a policy, without considering the physical structure of a storage.

Storage pool management is not performed by using partitions dependent upon OSes as in conventional techniques, but storage pool management is performed by using LUN which is a general management system independent from OSes. It is therefore possible to realize storage pool management compatible with a hetero server environment having a plurality of different types of OSes.

In this embodiment, pool management by using LUN is realized. Therefore, LUN formed for storage pool can be made secure by using the LUN security function of the storage which provides a LUN access exclusive control for servers. Pool management is therefore possible in the environment wherein a plurality of servers share a storage and LUN access exclusive control is necessary.

Even in the environment that a plurality type of pool managers having different applications and policies exist at the same time, management area exclusive control can be realized so that a proper pool manager can be selected. It is possible to avoid critical problems such as interference between management areas by a plurality of pool managers and erroneous deletion of user data.

Both the conventional LUN setting through direct operation of the storage setting utility by a user and LUN setting through storage pool management can be used. Therefore, a proper LUN setting method can be selected when necessary and at the same time a critical problem such as deletion of user data can be avoided.

A modification of the embodiment will be described. In this modification, a disk capacity can be increased on-demand when the disk capacity becomes insufficient, even if the past storage capacity use history and future use prediction cannot be obtained prior to forming LUN.

Figure 11:
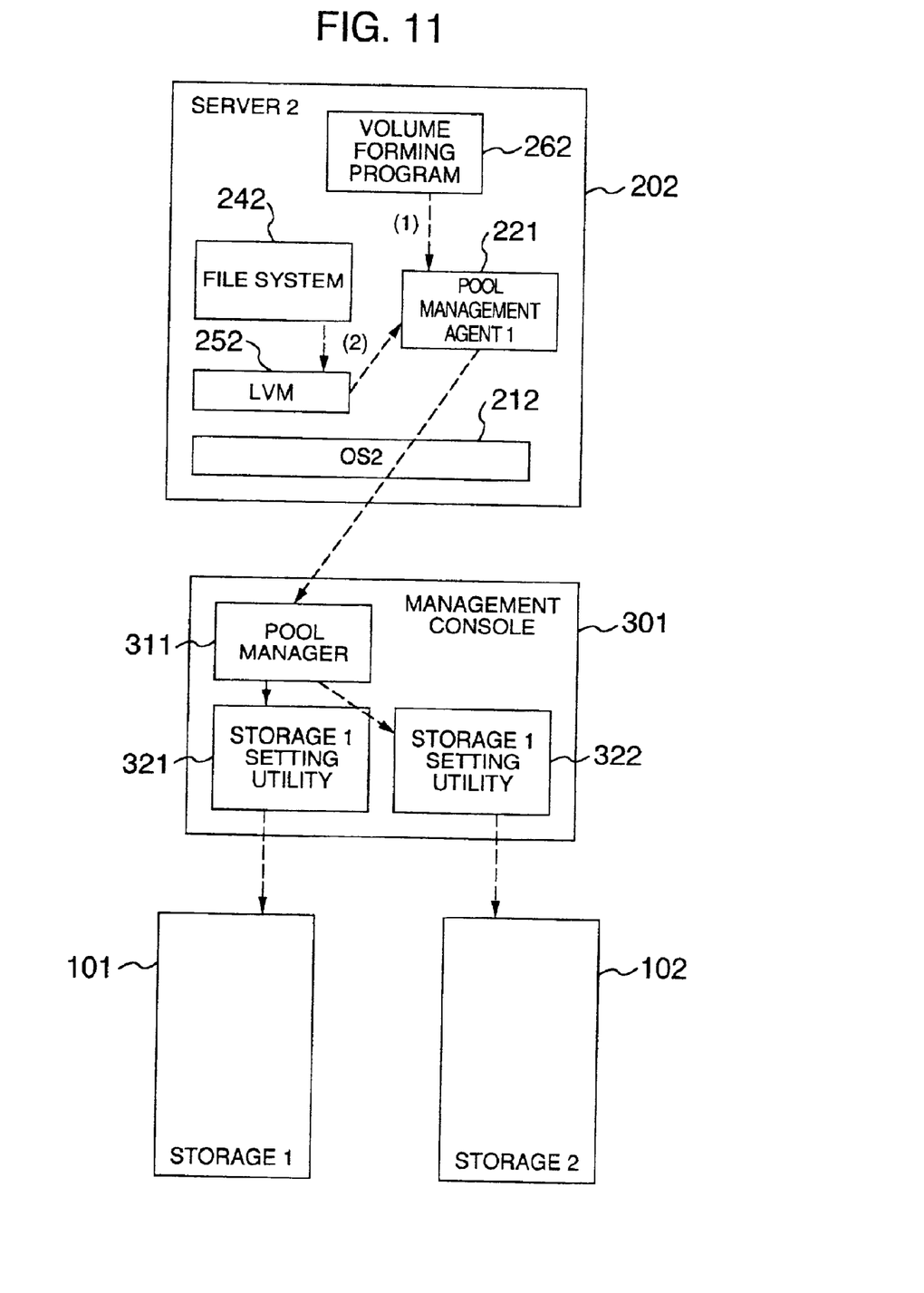
FIG. 11 is a diagram illustrating the configuration of a system according to a second embodiment of the invention.

FIG. 11 is a diagram showing the configuration of a system according to a modification of the embodiment. In FIG. 11, the server 2 (202), management console 1 (301), storage 1 (101) and storage 2 (102) are derived from FIG. 1.

Different points from the embodiment reside in that the server 2 has a file system 242 for file storage position management, a logical volume manager (LVM) 252 for logical volume management of volumes constituted of LUN to facilitate the use of volumes, and a volume forming program 262 for forming new volumes.

A method of forming a new volume will be described. This method corresponds to a line (1) in FIG. 11. A user instructs the volume forming program 262 to form a new volume having a proper size. At this time, the user designates only the necessary capacity without considering a future use prediction. Similar to the LUN forming program of the embodiment, setting policies are supplied to the user. The pool management agent 1 (221) transmits a server name, an HBA name of the server, WWN, setting policy and volume capacity to the pool manager 1 (311) of the management console 1 (301). The pool manager 1 (311) activates the LUN forming program 3113 to form LUN in the pool area 1 of the storage x similar to the first embodiment.

With the above operations, LUN can be formed. This LUN is called a LUNa. LUNa is used as a volume by the server 2 (202).

It is then assumed that the capacity of LUNa becomes insufficient. This correspond to a line (2) shown in FIG. 11. When the file system 242 for volume use capacity management detects that the user capacity exceeds a preset threshold value, it issues a volume expansion command to LVM 252. LVM 252 instructs the pool management agent 1 (221) to form a new LUN having a preset capacity or a capacity estimated as a proper capacity from the past volume use state. The pool management agent 1 (221) transmits the server name, HBA name of the server, WWN, setting policy used for forming the first volume, and capacity of the new LUN to the pool manager 1 (311) of the management console 1 (301). The pool manager 1 (311) activates the LUN forming program 3113 to form LUN (called a LUNb) in the pool area of the storage x similar to the first embodiment.

Upon reception of a completion notice of forming LUNb from the pool manager 1 (311), the pool management agent 1 (221) notifies LVM of a completion notice of forming the new LUNb. Upon reception of this completion notice, LVM 252 combines LUNa used as the volume and LUNb to form one logical volume and notifies this effect to the file system 242. The file system 242 generates file management information of the expanded area so that the whole logical volume can be used as one continuous file system area.

With the above operations, application can run continuously without knowing the expansion of the volume size. A user is not necessary at all to perform a cumbersome volume expanding work.

As described above, according to the modification, the volume capacity can be increased on-demand when it becomes insufficient, without involving any user work and confirmation by the application.

According to the present invention, LUN having a necessary capacity can be formed when necessary without deciding beforehand a necessary LUN capacity. A proper LUN can be formed for each host in accordance with a user metaphysical request called a policy which is preset. Since storage pool management is performed by using LUN, storage pool management independent from the types of OSes and servers can be realized matching a hetero server environment. Since LUN security can be set for each LUN, storage pool management can be realized even for a multi-platform environment in which a plurality of servers share one storage and LUN dedicated to each server can be formed. The environment with a plurality of storage pool managers can be configured, the pool managers having different use applications, different policies, different available types of storages. Both the conventional manual LUN setting without pool management and LUN setting through storage pool management can be used so that an optimum LUN setting method can be selectively used in accordance with user needs and use applications. A disk capacity can be increased on-demand when the disk capacity becomes insufficient, even if the past storage capacity use history and future use prediction cannot be obtained.

What is claimed is:

1. A method of setting a logical storage area to a storage pool of a storage apparatus from a management terminal, wherein said storage apparatus comprises a control unit and plural disks defining one or more RAID groups, and said storage pool including at least one RAID group, said method comprising:

at said management terminal, receiving management information of said at least one RAID group in said storage pool from said storage apparatus;

at said management terminal, setting a policy name for each of said at least one of RAID group in said storage pool according to said management information of said at least one RAID group;

at said management terminal, receiving a policy name for setting said logical storage area;

from said management terminal to said storage apparatus, transmitting information that is used to identify a RAID group corresponding to the received policy name to set said logical storage area satisfying condition associated with the received policy name; and sending a request including program identification information of a program executed in said management terminal to said storage apparatus, wherein said management terminal receives said management information of said at least one RAID group in said storage pool from said storage apparatus if said storage apparatus determines that said program is authorized to manage said storage pool by examining said program identification information.

2. A method according to claim 1, wherein said management information of said at least one RAID group includes capacity of each of said least one RAID group.

3. A method according to claim 1, wherein said sending step comprises sending said program identification information to said storage apparatus to set said logical storage area in a RAID group in said storage pool, which can be managed by using a program identified by said program identification information.

4. A management terminal provided in a computer system including a storage apparatus, said storage apparatus including a control unit and a plurality of disks, the plurality of disks defining at least one storage pool that includes one or more RAID groups, the management terminal configured to set a logical storage area in the at least one storage pool, the management terminal comprising:

means for receiving management information of said at least one RAID group in said storage pool from said storage apparatus;

means for setting a policy name for each of said at least one of RAID group in said storage pool according to said management information of said at least one RAID group;

means for receiving a policy name for setting said logical storage area;

means for transmitting to said storage apparatus information that is used to identify a RAID group corresponding to the received policy name to set said logical storage area satisfying condition associated with the received policy name; and means for sending a request including program identification information of a program executed in said management terminal to said storage apparatus, wherein said management terminal receives said management information of said at least one RAID group in said storage pool from said storage apparatus if said storage apparatus determines that said program is authorized to manage said storage pool by examining said program identification information.

5. A management terminal according to claim 4, wherein said management information of said at least one RAID group includes capacity of each of said least one RAID group.

6. A management terminal of claim 4, wherein said means for sending comprises means for transmitting said program identification information to said storage apparatus to set said logical storage area in a RAID group in said storage pool, which can be managed by using a program identified by said program identification information.

* * * * *